T. H. RUSSELL.
SAWMILL DOG.
No. 11,618.                    PATENTED AUG. 29, 1854.
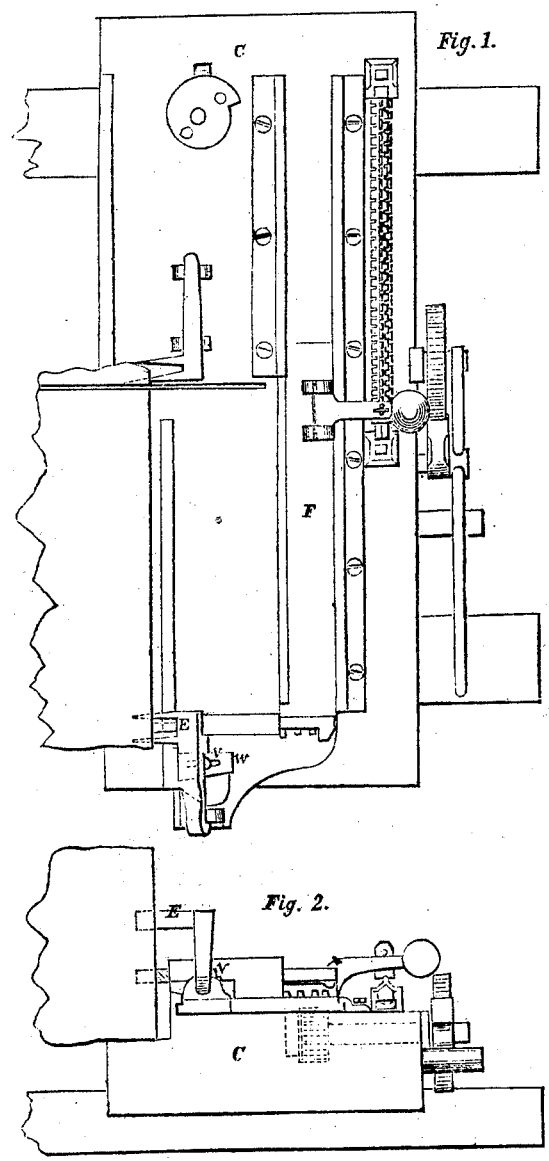

UNITED STATES PATENT OFFICE.

TITUS H. RUSSELL, OF TAFTSVILLE, VERMONT.

SAWMILL-DOG.

Specification of Letters Patent No. 11,618, dated August 29, 1854.

*To all whom it may concern:*

Be it known that I, TITUS H. RUSSELL, of Taftsville, in the county of Windsor and State of Vermont, have invented a new and useful Improvement in Sawmill-Dogs, of which the following is a full, clear, and exact description, reference being had to the accompanying drawings which form part of this specification, and in which—

Figure 1 represents a top view or plan of a log carriage, with its fixed and movable blocks fitted with my improved dogs, and carrying a log partly sawed; Fig. 2 represents a side elevation of the same; Fig. 3 an end view of the movable block; Fig. 4 an end view of the gage bar, and one of its polygonal bearings; and Fig. 5 an end view of the bearing for the bar.

The accompanying drawings represent the log (A), as resting at either end on steps, (a), which project from the inner sides of the fixed and movable blocks (B and C); these blocks rest on the side rails (c). By changing the position of the moving block (C), on the rails, the distance between it and the fixed block can be adapted to logs of different lengths. The movable block is held in place by a pressure lever or shoe (e), which may be made to bite against one side of the rail by a turning eccentric (f). The movable block (C), has the usual saw race (g), cut in it, and is provided with a stationary dog (D), placed on one side of the said race; this dog is furnished with projecting teeth that bite into the end of the log on the outside of the saw. This dog is hinged to the carriage to admit of its being driven forward or thrown back, according as it is required to clamp the log while sawing, or to release it during the operation of setting the log after one board is sawed, into the proper position to saw the next. A similarly hinged and toothed dog (E), is connected with the same carriage on the opposite side of the saw race, and serves to clamp the log on the inner side, or that at which the sawing terminates. This dog is mounted on a slide (F), which has motion given it along the block in either direction as required. This sliding dog not only serves to clamp the log, but also communicates the requisite transverse feed to the log to set it to be cut up into lumber; a supplementary sliding dog (h), Fig. 2, is driven into the log below the hinged dog (E); it is fitted loosely through a box formed on a standard on the slide on which the hinged dog is mounted. This horizontal or sliding dog has a head at its back, and a chisel at its front end. The head being hooked, furnishes a hold for the lever by which it is drawn out of the log. The lever which thus hooks over the head of the clamp, has for its fulcrum any one of a series of teeth (i), which proejct from the face of the slide (F). The slide (F), works between guides or rails (k). These guide rails are three in number, one extending nearly the whole length of the block, and the other two are placed parallel to it, but one ($k^2$) at a much greater distance than the other. The wide space between the guide rails, admits the wide end of the slide (F') which supports the dog and gives it a firm footing, while the narrow space between the rails, receives the narrow end of the slide, which passes the saw race, and thus has the necessary length to hold the dog firmly and steadily, which could not be done in slides arranged to move on one side only of the race.

The slide F is moved in either direction as required, by a pinion working into a rack cast, or otherwise secured to the under side of the slide; rotary motion is communicated to the pinion that operates the slide by means of a hand lever (G), that has a pall (l), that takes into a ratchet wheel (m), keyed on the shaft of the pinion; this pall (l), is pivoted to the lever, and made with a double clip, so that it may be swung over, or reversed, to drive the ratchet wheel in opposite directions, according to the required movement of the slide. The slide (F) is fitted with a weighted catch or detent (H), that acts as a stop to arrest the motion of the slide, by dropping into one of a series of notches made in a stationary gage bar (I); this gage bar is supported at either end in polygonal bearings (n), its own end being made of corresponding shape to fit therein. The bearings are open at their top to admit of the ready removal of the gage bar. The gage bar has a series of longitudinal ribs on its surface, in the same line or thereabout as the angles formed by the meeting of the sides of the polygonal bearings; each of these ribs has a series of equidistant notches (s), made in it throughout its length, each series commencing at a common ring of notches at the inner end of the gage and the distance of the notches in each rib differs; the distances between these notches correspond to the several thicknesses of lumber into which it is usual to cut logs, and the catch (H), as it drops into the several notches consecutively, of the uppermost rib arrests the transverse feed of the log, and holds it at the point required for sawing off a board of the proper thickness; the thickness of the lumber will be regulated by the rib which is uppermost, as will hereafter be more fully explained in describing the operation of these devices.

The stationary or tail block (B), which supports one end of the log is provided with a hinged dog (J), and sliding dogs (o and r), mounted on, or constructed with a traveling slide ($F^2$), which is operated by a pall, ratchet, rack and pinion, and held by a detent ($H^2$), in the same manner as the corresponding parts of the dogs of the moving block; the pitch of the notches in the gage bar of the fixed block are the same as those in the moving block that the dogs may move through equal spaces to insure equal feed at both ends of the log.

The graduation of the notches in the gage bar of the fixed or tail block, commences from a ring of notches at the middle of the bar. The detent is represented with its tooth in this ring. The latter therefore is not seen in the drawing. The detent ($H^2$) is fixed in such a position with reference to the dog (J) that when the tooth of the detent is in the initial notch (s) of any series of notches, the space between the bitts of the dog will be centrally opposite the saw race (g) thus avoiding all danger of the saw teeth, striking upon the bitts of the dog. Moreover the commencement of the graduation, at the middle of the rod adapts this sliding dog to work either to the right or left, thus dispensing with a supplementary bail dog, such as is used on the moving or head block.

The log to be cut is placed upon the saw blocks (B and C), in proper relation to the saw, each gage bar is so seated in its bearings as to present the row of notches uppermost whose divisions correspond to the thickness of the lumber to be cut, the weighted drop catches (H $H^2$), being raised out of gear with the gage bars, the sliding dogs and clamps at either end are then adjusted to the proper position and driven into the ends of the log as represented, the weighted catches (H $H^2$), are then dropped into gear with the ring notch in either gage bars. Motion is now given to the carriage, and the saw put in motion in the usual way when the slab on the outside of the log will be cut off; the log is then run back, and set by a transverse movement of the sliding dogs along the blocks, the detents (H, $H^2$), being previously lifted, and the fixed dog (D), withdrawn from the log. As soon as the transverse movement of the log begins, the detent is allowed to rest upon the notch rib of the gage bar, and will drop into the first notch it meets; this being done at both ends of the log the setting is complete, the sawing again resumed and continued until the log is divided from end to end, when it is again run back, and the setting repeated.

To vary the set or transverse movement of the log according to the thickness of lumber required to be cut, the gage bars are lifted out of their bearings, turned so as to present those ribs uppermost which have notches in them corresponding to the required thickness of board, and are then reinserted in their bearings and the ends of the gage bars where they enter their bearings being polygonal, the gage is prevented from being changed by accidental turning to which, as heretofore constructed and arranged, it is very liable.

One source of inequality in sawing is the working loose of the hinges of the dogs, but no simple and convenient mode of keeping these hinges tight have heretofore been discovered; hence every time the log is set, the bail has to be propped sidewise to keep it from working, when accuracy of sawing is required. To remedy this defect, I have arranged a wedge or tapering block (w) between an oblong projection (x) and the hinge of the dog, which wedge is held in whatever position it may be adjusted by a set screw (v). Whenever the dog becomes too loose, the wedge is moved in to tighten it. To take the dog off its hinges it is only necessary to remove this wedge and slide it out; but under the former construction, the eye bolts of the hinges would both have to be unscrewed and taken out, in order to get the dog off. This facility for removing the dog is an incidental advantage resulting from my improvement.

What I claim as my invention, and desire to secure by Letters Patent, is—

1. The device herein described to keep the hinges of the dogs tight, and thereby more effectually maintain the straightness of the saws kerfs and uniformity in the thickness of the lumber.

2. I likewise claim the construction of the slide, which carries the dog of the head block, with a broad platform to support the dog firmly against lateral pressure, and a long narrow arm to extend back of the saw race to the opposite end of the block, the wide and narrow portions of the slide, moving on parallel guide rails of corresponding width, whereby the dog while necessarily limited to a short support on that end of the head block on which it rests, is by this supplementary slide arm, seated as firmly on the block, as if its slide could be made to extend across the saw race, thus avoiding the binding and other difficulties which have heretofore existed from want of length and firmness, in the sliding dogs of the head blocks.

In testimony whereof, I have hereunto subscribed my name.

TITUS H. RUSSELL.

Witnesses:
 ANDREW TRACY,
 DENNIS N. COOLEY.